(12) United States Patent
Bailey et al.

(10) Patent No.: US 11,795,793 B2
(45) Date of Patent: Oct. 24, 2023

(54) DRILLING MEASUREMENT VALUATION

(71) Applicant: SCHLUMBERGER TECHNOLOGY CORPORATION, Sugar Land, TX (US)

(72) Inventors: William Bailey, Cambridge, MA (US); Dzevat Omeragic, Lexington, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 840 days.

(21) Appl. No.: 16/310,444

(22) PCT Filed: Jun. 24, 2016

(86) PCT No.: PCT/US2016/039134
§ 371 (c)(1),
(2) Date: Dec. 17, 2018

(87) PCT Pub. No.: WO2017/222540
PCT Pub. Date: Dec. 28, 2017

(65) Prior Publication Data
US 2019/0330963 A1 Oct. 31, 2019

(51) Int. Cl.
*E21B 43/12* (2006.01)
*G06F 17/40* (2006.01)
(Continued)

(52) U.S. Cl.
CPC ............ *E21B 43/12* (2013.01); *E21B 47/003* (2020.05); *G05B 17/02* (2013.01); *G06F 17/18* (2013.01); *G06F 17/40* (2013.01)

(58) Field of Classification Search
CPC ........ E21B 43/12; E21B 47/003; E21B 49/00; G06F 17/40; G06F 17/18; G05B 17/02; G01V 2210/663
See application file for complete search history.

(56) References Cited

U.S. PATENT DOCUMENTS 6,297,639 B1  10/2001 Clark et al.
6,594,584 B1   7/2003 Omeragic et al.
(Continued)

FOREIGN PATENT DOCUMENTS

| WO | WO2007084741 | * | 7/2007 | |
| WO | WO2011100009 | * | 8/2011 | ............... G06G 7/48 |
| WO | WO2013/074411 | * | 5/2013 | .............. E21B 47/12 |

OTHER PUBLICATIONS

"Oil-water contact". Schllumberger Oilfield Glossary [retreived on Sep. 2, 2021] Retrieved from <https://glossary.oilfield.slb.com/en/terms/o/oil-water_contact>. (Year: 2021).*
(Continued)

*Primary Examiner* — Rehana Perveen
*Assistant Examiner* — Alfred H B Wechselberger
(74) *Attorney, Agent, or Firm* — Alec J. McGinn

(57) ABSTRACT

Systems, computer-readable media, and methods for valuating measurement data, of which the method includes obtaining a first model of a subsurface volume, determining a baseline control parameter based on the first model, receiving new measurement data measured using a data collection device, the new measurement data representing one or more characteristics of the subsurface volume, and obtaining a second model of the subsurface volume based in part on the new measurement data. The first model is not based on the new measurement data. Further, the method includes determining an enhanced control parameter based on the second model, determining an enhanced value corresponding to the second model using the enhanced control parameter, determining a realized value corresponding to the second model using the baseline control parameter, and calculating a value of the new measurement data by comparing the enhanced value and the realized value.

12 Claims, 13 Drawing Sheets

(51) Int. Cl.
G05B 17/02 (2006.01)
G06F 17/18 (2006.01)
E21B 47/003 (2012.01)

(56) References Cited

U.S. PATENT DOCUMENTS

| | | | |
|---|---|---|---|
| 6,775,578 | B2 | 8/2004 | Couet et al. |
| 6,969,994 | B2 | 11/2005 | Minerbo et al. |
| 7,656,160 | B2 | 2/2010 | Legendre et al. |
| 9,294,914 | B2 | 3/2016 | Wilfred et al. |
| 2007/0055447 | A1 | 3/2007 | Mickaele et al. |
| 2007/0289740 | A1* | 12/2007 | Thigpen .............. E21B 43/14 166/250.01 |
| 2009/0234625 | A1 | 9/2009 | Zangl et al. |
| 2009/0271233 | A1* | 10/2009 | Prange ................ E21B 47/00 706/46 |
| 2011/0063292 | A1 | 3/2011 | Holl et al. |
| 2011/0106514 | A1 | 5/2011 | Omeragic et al. |
| 2012/0232859 | A1 | 9/2012 | Pomerantz et al. |
| 2013/0338986 | A1 | 12/2013 | Nymes et al. |
| 2014/0257577 | A1* | 9/2014 | Prange ................ E21B 43/12 700/282 |
| 2016/0273315 | A1* | 9/2016 | Carvajal ............. E21B 43/12 |
| 2017/0059734 | A1* | 3/2017 | Mattsson ............ G01V 3/083 |

OTHER PUBLICATIONS

"Gas-oil contact". Schllumberger Oilfield Glossary [retreived on Sep. 2, 2021] Retrieved from <https://glossary.oilfield.slb.com/en/terms/g/gas-oil_contact>. (Year: 2021).*
Branco et al. "The Role of the Value of Information and Long Horizontal Wells in the Appraisal and Development Studies of a Brazilian Offshore Heavy-Oil Reservoir" SPE-PS-CIM/CHOA 97846, SPE/PS-CIM/CHOA Int. Thermal Operations and Heavy Oil Symposium; Alberta, Canada [retreived on Sep. 1, 2021] (Year: 2005).*
Bailey et al. "Framework for Field Optimization To Maximize Asset Value" SPE 87026; 2004 SPE Asia Pacific Conf, on Integrated Modelling for Asset Management, Kuala Lumpur [retrieved on Aug. 30, 2021] (Year: 2005).*
Al-Khelaiwi, F. "A Comprehensive Approach to the Design of Advanced Well Completions" [thesis] Institute of Petroleum Engineering, Heriot-Watt University, Edinburgh, Scotland [retrieved on Sep. 1, 2021] (Year: 2013).*
Luo et al. "An ensemble-based framework for proactive geosteering" SPWLA 56th Annual Logging Symposium, Long Beach, CA, USA [retrieved on Aug. 31, 2021] (Year: 2015).*
Wills et al. "Information Has Cost, Does it Have Value?" Paper 2004-231, Canadian International Petroleum Conference [retrieved on Aug. 31, 2021] (Year: 2004).*
Al-Khelaiwi, F. "A Comprehensive Approach to the Design of Advanced Well Completions" [thesis] vol. I and II, Institute of Petroleum Engineering, Heriot-Watt University, Edinburgh, Scotland [retrieved on Sep. 1, 2021] (Year: 2013).*
MoradiDowlatabad et al. "The Improvement of Production Profile While Managing Reservoir Uncertainties with Inflow Control Devices Completions" SPE-173841-MS [retrieved on Jun. 26, 2023] (Year: 2015).*
Schiozer et al. "Integrated Model Based Decision Analysis in Twelve Steps Applied to Petroleum Fields Development and Management" SPE-174370-MS [retrieved on Jun. 26, 2023] (Year: 2015).*
Nardi et al. "Evaluation of Parameter Uncertainty Utilizing Resolution Analysis in Reservoir Navigation Increases the Degree of Accuracy and Confidence in Well-bore Placement" SPWLA 51st Annual Logging Symposium, Jun. 19-23, 2010 [retrieved on Jun. 26, 2023] (Year: 2010).*
Esmaiel et al. "Optimization of the WAG Process Under Uncertainty in a Smart Wells Environment: Utility Theory Approach" SPE 100009 [retrieved on Jun. 26, 2023] (Year: 2006).*
Fouda et al. "New Resistivity Models for Reservoir Monitoring Applications" SPWLA 56th Annual Logging Symposium, Jul. 18-22, 2015 [retrieved on Jun. 26, 2023] (Year: 2015).*
Balan et al. "Deep Reading Technology Integrated with Inflow Control Devices to Improve Sweep Efficiency in Horizontal Waterfloods" SPE-183566-MS [retrieved on Jun. 26, 2023] (Year: 2016).*
Becerra et al. "Uncertainty History Matching and Forecasting, a Field Case Application" SPE 153176 [retrieved on Jun. 25, 2023] (Year: 2012).*
Gohari et al. "Novel Workflow for the Development of a Flow Control Strategy with Consideration of Reservoir Uncertainties" SPE-177427-MS [Jun. 25, 2023] (Year: 2015).*
Goodwin et al. "Bridging the Gap Between Deterministic and Probabilistic Uncertainty Quantification Using Advanced Proxy Based Methods" SPE-173301-MS [retrieved on Jun. 25, 2023] (Year: 2015).*
Search Report for the counterpart European patent application 16906459.9 dated Feb. 3, 2020.
Abreu, et al., "Maximizing the Value of Operational Flexibility: An Application to Smart Wells," IBP1258_14, Ril Oil & Gas Expo and Conference, Institute Brasileiro de Petroleo, Gas e Biocombustiveis (IB0), Rio de Janeiro, Brazil, Sep. 15-18, 2014.
Akre, et al., "Smart Well with Autonomous Inflow Control Valve Technology," SPE Middle East Oil and Gas Show and Exhibition held in Manama, Bahrain, Mar. 10-13, 2013.
Al-Khelaiwa, et al., "Advanced Wells: A Comprehensive Approach to the Selection Between Passive and Active Inflow-Control Completions," Aug. 2010 SPE Production & Operations, pp. 305-326.
Al-Khelaiwa, et al., "Inflow Control Devices: Application and Value Quantification of a Developing Technology," 2007 International Oil Conference and Exhibition in Mexico held in Veracruz, Mexico, Jun. 27-30, 2007.
Antonsen, et al., "Net Pay Optimization and Improved Reservoir Mapping From Ultra-Deep Look Around LWD-Measurements," Abu Dhabi International Petrum Exhibition and Conference held in Abu Dhabi, UAE, Nov. 10-13, 2014.
Bailey, et al., "Framework for Field Optimization to Maximize Asset Value," Feb. 2005 SPE Reservoir Evaluation Engineering, pp. 7-21.
Birchenko, et al., "Advanced Wells: How to Make a Choice Between Passive and Active Inflow-Control Completions," 2008 Annual Technical Conference and Exhibition held in Denver, Colorado, USA Sep. 21-24, 2008.
Carvajal, et al., "A Smart Flow for Smart Wells: Reactive and Proactive Modes," SPE Intelligent Energy Conference and Exhibition held in Utrecht, The Netherlands, Apr. 1-3, 2014.
Constable, et al., "Improving Well Placement and Reservoir Characterization with Deep Directional Resistivity Measurements," SPE Annual Technical Conference and Exhibition held in San Antonio, Tx, USA, Oct. 8-10, 2012.
Cullick, et al., "Smart Operations with Intelligent Well System," SPE Intelligent Energy Conference and Exhibition held in Utrecht, The Nethedands, Mar. 23-25, 2010.
Edabi, et al., "Should 'Proactive' or 'Reactive' Control be Chosen for Intelligent Well Management?," 2006 SPE Intelligent Energy Conference and Exhibition held in Amsterdam, The Netherlands, Apr. 11-13, 2006.
Eltaher, et al., "Performance of Autonomous Inflow Control Completion in Heavy Oil Reservoirs," International Petroleum Technology Conference, Kuala Lumpur, Malaysia, Dec. 10-12, 2014.
Fripp, et al., "The Theory of a Fluidic Diode Autonomous Inflow Control Device," SPE Middle East Intelligent Energy Conference and Exhibition held in Dubai, UAE, Oct. 28-30, 2013.
Grebenkin, et al., "Analysis of the Impact of an Intelligent Well Completion on the Oil Production Uncertainty," 2010 SPE Russian Oil & Gas Technical Conference and Exhibition held in Moscow, Russia, Oct. 26-28, 2010.
Gurses, et al., "Optimizes Modeling Workflows for Designing Passive Flow Control Devices in Horizontal Wells," SPE Reservoir Characterisation and Simulation Conference and Exhibition held in Abu Dhabi, UAE, Sep. 16-18, 2013.

(56) References Cited

OTHER PUBLICATIONS

Halvorsen, et al., "Increased Oil Production at Troll by Autonomous Inflow Control with RCP Valves," SPE Annual Technical Conference and Exhibition held in San Antonio, TX, USA Oct. 8-10, 2012.
Holmes, et al., "Application of a Multisegment Well Model to Simulate Flow in Advanced Wells," 1998 SPE European Petroleum Conference held in The Hague, The Netherlands, Oct. 20-22, 1998.
Konopczynski, et al., "Design of Intelligent Well Downhole Valves for Adjustable Flow Control," SPE Annual Technical Conference and Exhibition held in Houston, TX USA Sep. 26-29, 2004.
Li, et al., "New Directional Electromagnetic Tool for Proactive Geosteering and Accurate Formation Evaluation While Drilling," SPWLA 46th Annual Logging Symposium, New Orleans, Louisiana, Society of Petorphysicists and Well Log Analysts, Jun. 26-29, 2005.
Maggs, et al., "Production Optimization for Second Stage Field Development Using ICD and Advanced Well Placemen Technology," 2008 SPE Europec/EAGE Annual Conference AND Exhibition held in Rome, Italy, Jun. 9-12, 2008.
Mathiesen, et al., "The Autonomous RCP Valve—New Technology for Inflow Control in Horizontal Wells," SPE Offshore Europe Oil and Gas Conference and Exhibition held in Aberdeen, UK, Sep. 6-8, 2011.
Neylon, et al., "Modeling Well Inflow Control with Flow in Both Annulus and Tubing," 2009 SPE Reservoir Simulation Symposium held in The Woodlands, TX USA Feb. 2-4, 2009.
Omeragic, et al., "Real-Time Interpretation of Formation Structure from Directional EM Measurements," SPWLA 47th Annual Logging Symposium, Veracruz, Mexico, Society of Petrophysicists and Well Log Analysts, Jun. 4-7, 2006.
Raghuraman, et al., "Valuation of Technology and Information for Reservoir Risk Management," 2002 SPE Annual Technical ConTerence and Exhibition, San Antonio, TX Sep. 29-Oct. 2, 2002, pp. 307-315.
Rashid, et al., "An Efficient Procedure for Expensive Reservoir Simulation Optimization Under Uncertainty," Oct. 2013 SPE Economics & Management, pp. 21-33.
Sang, et al., "A Novel Autonomous Inflow Control Device Design Based on Water Swelling Rubber," IADC/SPE Asia Pacific Drilling Technology Conference held in Bangkok, Thailand, Aug. 25-27, 2014.
Seydoux, et al., "Full 3D Deep Directional Resistivity Measurements Optimize Well Placement and Provide Reservoir-Scale Imaging While Drilling," SPWLA 55th Annual Logging Symposium, Abu Dhabi, U.A.E., Society of Petrophysicists and Well Log Analysts, May 18-22, 2014.
Stone, et al., "Optimal Control of Single and Multiple Inflow Control Valves in Production Wells," WHOC12-297, World Heavy Oil Congress, Aberdeen, UK, Sep. 10-13, 2012.
Zhao, et al., "Fluidic Diode Autonomous ICD Range—Phase Testing," SPE Oilfield Water Management Conference and Exhibition held in Kuwait City, Kuwait, Apr. 21-22, 2014.
International Search Report and Written Opinion for the equivalent International patent application PCT/US2016/039134 dated Mar. 20, 2017.
International Preliminary Report on Patentability for the equivalent International patent application PCT/US2016/039134 dated Jan. 3, 2019.

\* cited by examiner

| | Optimized ICD area, $A_{c[k]} \times 10^{-3}$ in² | | | |
|---|---|---|---|---|
| ICD Index $k$ | 1→30 | 31→60 | 61→90 | 91→120 |
| Model α, $A_c \times 10^{-3}$ in² | 13.4 | 3.1 | 11.6 | 3.1 |
| Model α Optimum values | | | | | ←1102
| Model β, $A_c \times 10^{-3}$ in² | 3.1 | 3.1 | 17.7 | 3.1 |
| Model β Optimum values | | | | | ←1104

FIG. 11

DRILLING MEASUREMENT VALUATION

BACKGROUND

Various measurement techniques can provide information about a subterranean formation. This information can be employed to build a computer model representing the relevant subterranean volume (referred to as a "reservoir model"). In turn, the reservoir model can be employed to select or design well trajectories, completion designs, etc.

The uncertainty of the model is based on the uncertainty in the measurements provided. For example, deep directional resistivity (DDR) measurements are sometimes employed in drilling wells. This measurement allows mapping of the resistivity boundaries and contacts in the formation and evaluating reservoir structure 30 meters or more away from the wellbore. DDR data may, for example, reduce the uncertainty of the location of the oil-water contact in the model, among other things.

There is a tradeoff, however, between taking measurements and the cost associated therewith. While additional measurements may reduce uncertainty in the model, and thereby increase confidence in decisions made based on the model, each measurement can take time and money. Furthermore, different operators may have different risk tolerances. A reduction in uncertainty may reduce risk, and thus a given level of uncertainty may be acceptable for some operators, while more measurements, to reduce uncertainty, may be called for with other operators. Determining which situation is at hand can be a challenge.

SUMMARY

Embodiments of the disclosure may provide a method for valuating measurement data. The method includes obtaining a first model of a subsurface volume, determining a baseline control parameter based on the first model, receiving new measurement data measured using a data collection device, the new measurement data representing one or more characteristics of the subsurface volume, and obtaining a second model of the subsurface volume based in part on the new measurement data. The first model is not based on the new measurement data. The method also includes determining an enhanced control parameter based on the second model, determining an enhanced value corresponding to the second model using the enhanced control parameter, determining a realized value corresponding to the second model using the baseline control parameter, and calculating a value of the new measurement data by comparing the enhanced value and the realized value.

In some embodiments, the first model includes a first plurality of uncertainty samples, and the second model includes a second plurality of uncertainty samples, the second plurality of uncertainty samples being calculated based on the new measurement data.

In some embodiments, the first plurality of uncertainty samples includes a uniform probability distribution across a zone of uncertainty, and the second plurality of uncertainty samples includes a Gaussian probability distribution across the zone of uncertainty.

In some embodiments, determining the baseline control parameter includes applying a risk-aversion factor in an objective function for the first model, and determining the enhanced control parameter includes applying the risk-aversion factor in an objective function for the second model.

In some embodiments, determining the baseline control parameter includes selecting the baseline control parameter that maximizes a value corresponding to the first model.

In some embodiments, the baseline control parameter includes a flowpath area of a flow control device in a completion, and the enhanced control parameter includes the flowpath area of the flow control device.

In some embodiments, the new measurement includes a deep-directional-resistivity measurement, and wherein the one or more characteristics comprises an oil-water contact location.

In some embodiments, the method also includes adjusting an operation strategy, a completion design, or a well trajectory based on the new measurement data.

Embodiments of the disclosure may also provide a computing system including one or more processors, and a memory system including one or more non-transitory computer-readable media storing instructions that, when executed by at least one of the one or more processors, cause the computing system to perform operations. The operations include obtaining a first model of a subsurface volume, determining a baseline control parameter based on the first model, and receiving new measurement data measured using a data collection device, the new measurement data representing one or more characteristics of the subsurface volume. The operations also include obtaining a second model of the subsurface volume based in part on the new measurement data. The first model is not based on the new measurement data. The operations further include determining an enhanced control parameter based on the second model, determining an enhanced value corresponding to the second model using the enhanced control parameter, determining a realized value corresponding to the second model using the baseline control parameter, and calculating a value of the new measurement data by comparing the enhanced value and the realized value.

Embodiments of the disclosure may further provide a non-transitory computer-readable medium storing instructions that, when executed by at least one processor of a computing system, cause the computing system to perform operations. The operations include obtaining a first model of a subsurface volume, determining a baseline control parameter based on the first model, and receiving new measurement data measured using a data collection device, the new measurement data representing one or more characteristics of the subsurface volume. The operations also include obtaining a second model of the subsurface volume based in part on the new measurement data. The first model is not based on the new measurement data. The operations further include determining an enhanced control parameter based on the second model, determining an enhanced value corresponding to the second model using the enhanced control parameter, determining a realized value corresponding to the second model using the baseline control parameter, and calculating a value of the new measurement data by comparing the enhanced value and the realized value.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 11 illustrates an example of the resulting change in the flow control devices of a completion, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the present disclosure. The first object and the second object are both objects, but they are not to be considered the same object.

The terminology used in the description herein is for the purpose of describing particular embodiments and is not intended to be limiting. As used in this description and the appended claims, the singular forms "a," "an," and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
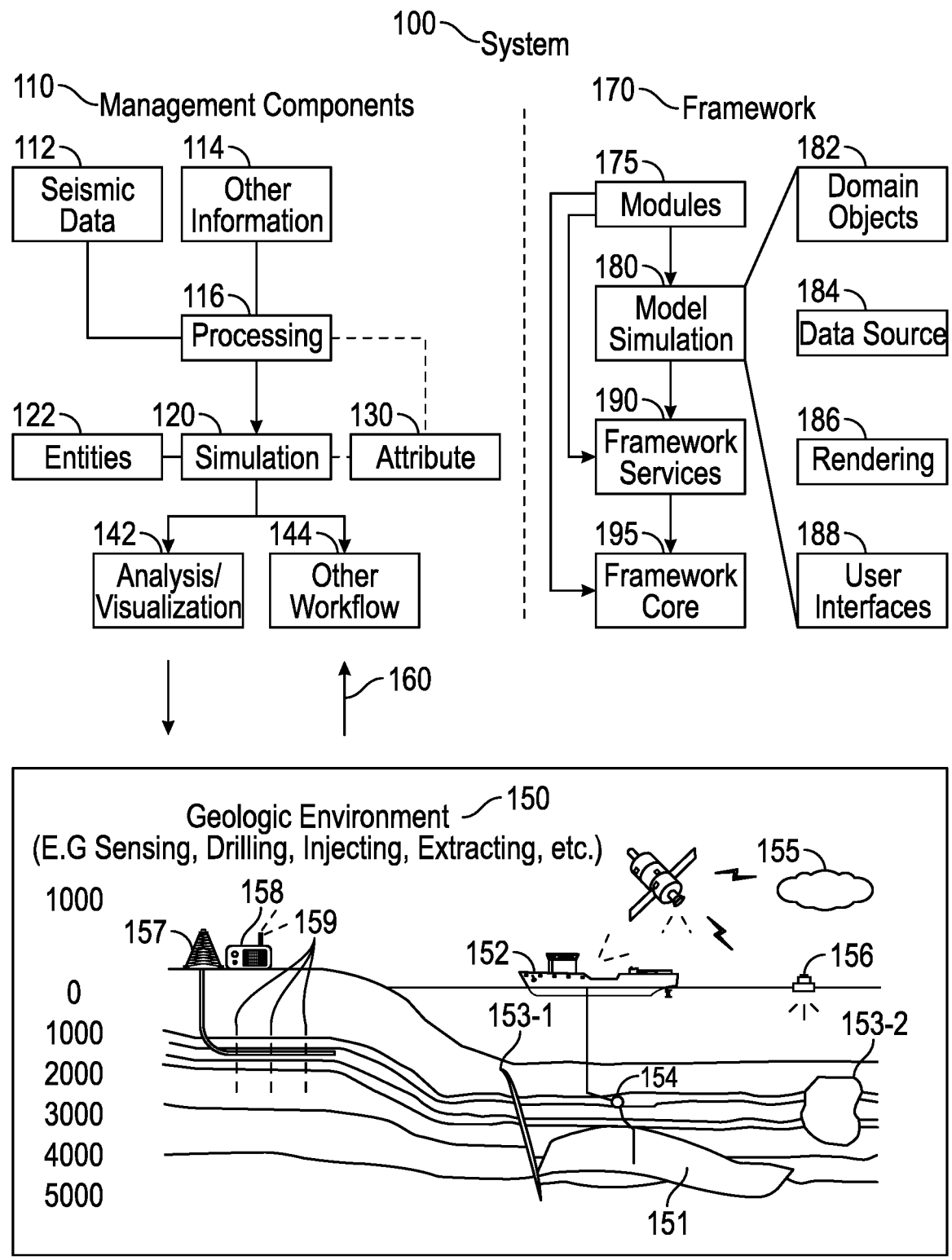
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142, and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as steam-assisted gravity drainage (SAGD), etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored, and stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
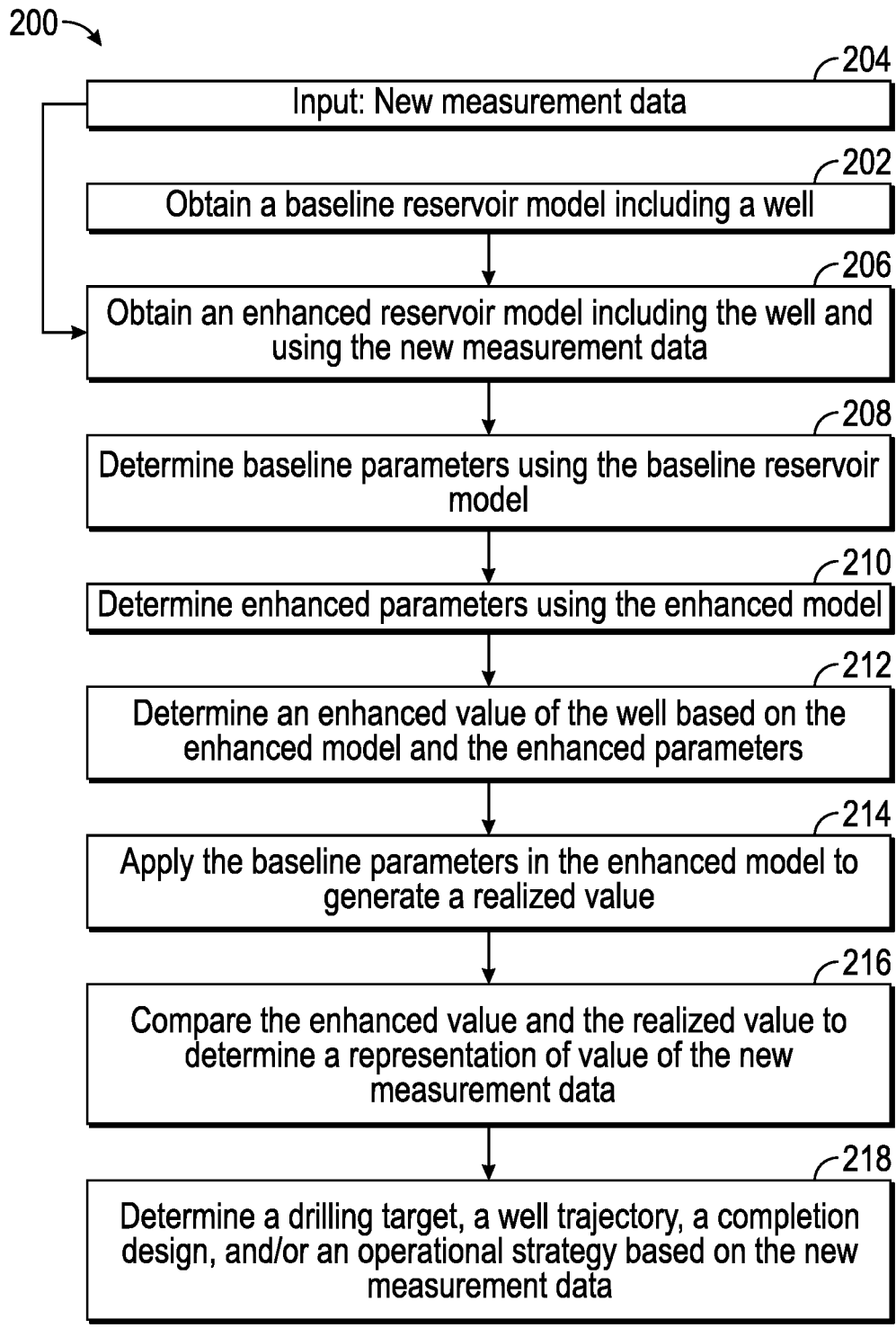
FIG. 2 illustrates a flowchart of a method for valuating a measurement in a reservoir model, according to an embodiment.

FIG. 2 illustrates a flowchart of a method 200 for valuating a measurement in a reservoir model, according to an embodiment. The method 200 is described herein with reference to valuating deep directional resistivity (DDR) measurements, but it will be appreciated that the present method may be employed for any one or more of a variety of other measurements, and thus DDR is not to be considered limiting unless otherwise specified herein.

The method 200 may begin by obtaining a baseline reservoir model including a well, as at 202. The reservoir model may include locations and delineation of rock formations, characteristics of the rock formations, hydrocarbon and/or water locations and distributions, flow regimes, etc. The reservoir model may be constructed based on a variety of measurements, including well logs, seismic measurements, and/or any other type of measurement. The measurements may be taken using measurement devices, whether on the surface or downhole, in a wellbore while drilling or after drilling. In some embodiments, the method 200 may include generating the model based on such measurements, but in other embodiments, the method 200 may receive a model created by another process.

The method 200 may then include receiving, as input, new measurement data, as at 204. As an illustrative example, the new measurement data may be DDR data or the model constructed based on an inversion of DDR data. The new measurement data may be incorporated into the reservoir model, to result in a new reservoir model including the well and the new measurement data, as at 206. Because the new reservoir model includes additional data that was not included in the baseline model obtained at 202, the new model obtained at 206 may be considered "enhanced."

The baseline model may be employed to determine baseline parameters, as at 208. This may occur before, during, or after receiving the new measurement data and/or generating the enhanced model. In an embodiment, the baseline parameters may be determined without consideration to the new measurement data. The baseline parameters may be employed to set any variable related to the well, completion, operation, or strategy. To name one illustrative example, the baseline parameters may be the flowpath area of the openings into the production string. The flowpath areas may be determined, for example, by flow control devices located in or around the openings. Such flow control devices may include inflow control devices (ICDs), including nozzles, orifices, or channels, as well as autonomous inflow control devices. In some instances, the size of the ICDs may be selected to determine the flowpath area. Flow control devices may also or instead include flow control valves, inflow control valves (adjustable flowpath area, whether active or reactive), autonomous inflow control devices, and/or any other suitable devices.

In some embodiments, the baseline parameters (flowpath areas of the flow control devices) may be selected to result in generally consistent drainage into the production string across a section of the wellbore. In other embodiments, the baseline parameters may be selected to achieve other results, generally seeking to increase hydrocarbon recovery. Various techniques for selecting the one or more (potentially hundreds, or infinite, theoretically, with continuous ICDs) of different sizes for the flow control devices in a single completion are known and any suitable technique may be employed. An example workflow for selecting the parameters will be described below.

The method 200 may then proceed to determining enhanced parameters using the enhanced model, as at 210. For example, the method 200 may determine the same parameters as were determined at 208, except using the enhanced reservoir model that takes into account the new measurement data. Further, the enhanced parameters may be determined using the same technique as the baseline parameters.

The enhanced parameters in the enhanced well may enable a determination of a value for the well, which may be determined at 212. The value may be based on the amount of hydrocarbons, over a certain amount of time, which can be recovered from the well with the parameters selected. This will also be explained in greater detail below.

The method 200 may then include applying the baseline parameters in the enhanced model to generate a realized value, as at 214. Accordingly, the baseline parameters, which were selected using the baseline model, i.e., without the benefit of the additional measurement data, are plugged into the enhanced model, in order to determine more accurately what the behavior of the reservoir will be using the baseline parameters. The realized value may be calculated in the same manner as the value of the well with the enhanced parameters.

The method 200 may then proceed to comparing the enhanced value and the realized value to determine a representation of value of the new measurement data, as at 216. Since the two models are the same, except for the new measurement data, the new measurement data explains the difference in their behaviors, leading to the different parameters being selected. Since the enhanced model includes additional information, it may be assumed to more accurately represent the reality of the behavior of the reservoir and well. Accordingly, the gains made by employing the new measurement data may be determined by comparing the behavior of the more accurate model under the different parameters. The difference in values may thus be attributable to the additional information.

The method 200 may thus allow for a determination of whether the new measurement data was worthwhile, e.g., in comparison to the cost to collect the data. This may inform future decision-making with respect to whether new measurements are called for. Furthermore, since the new measurements are available, they may be employed to determine a drilling target, a well trajectory, a completion design, and/or an operation strategy based, as at 218. For example, the enhanced parameters may be put into effect. Continuing with the specific example of the flowpath areas, appropriately-sized and/or configured flow control devices may be installed in the completion.

Figure 3A:
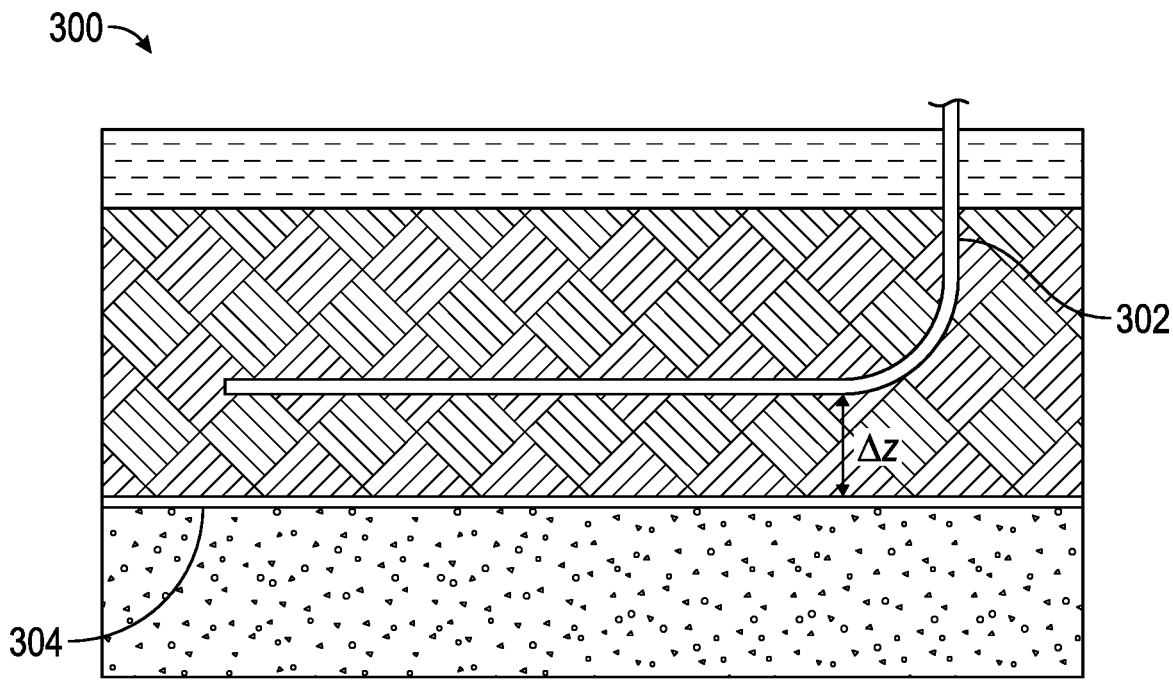
FIGS. 3A, 3B, 3C, and 3D illustrate views of a reservoir model including a well, according to an embodiment.
Figure 3B:
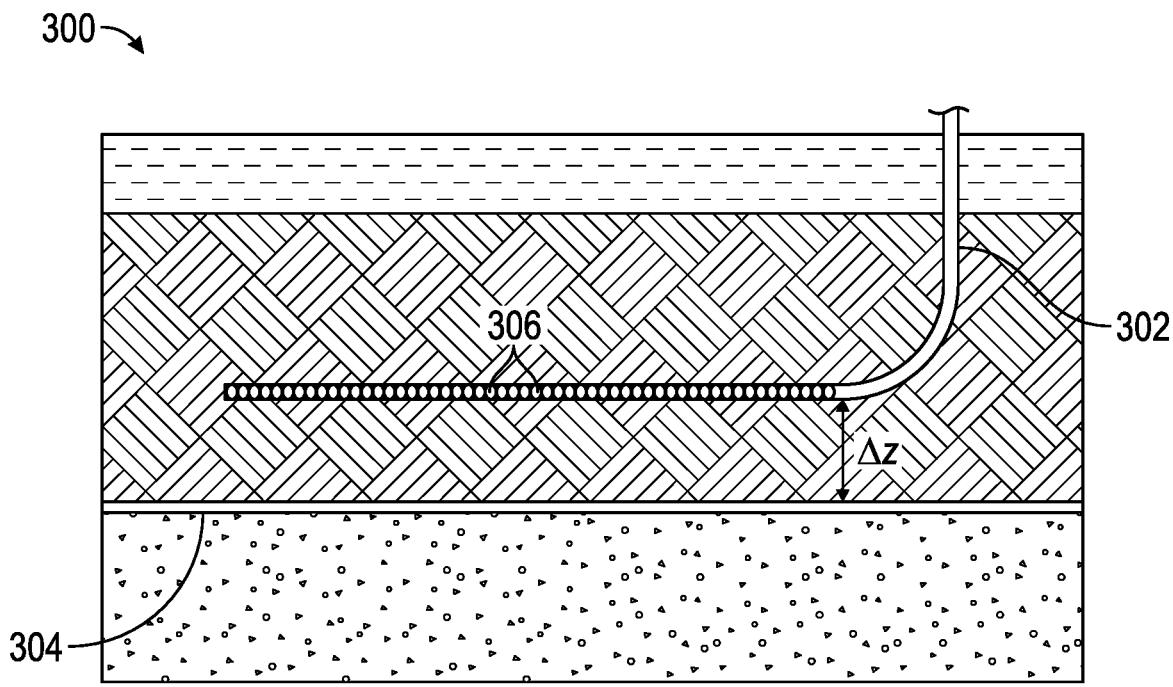
Figure 3C:
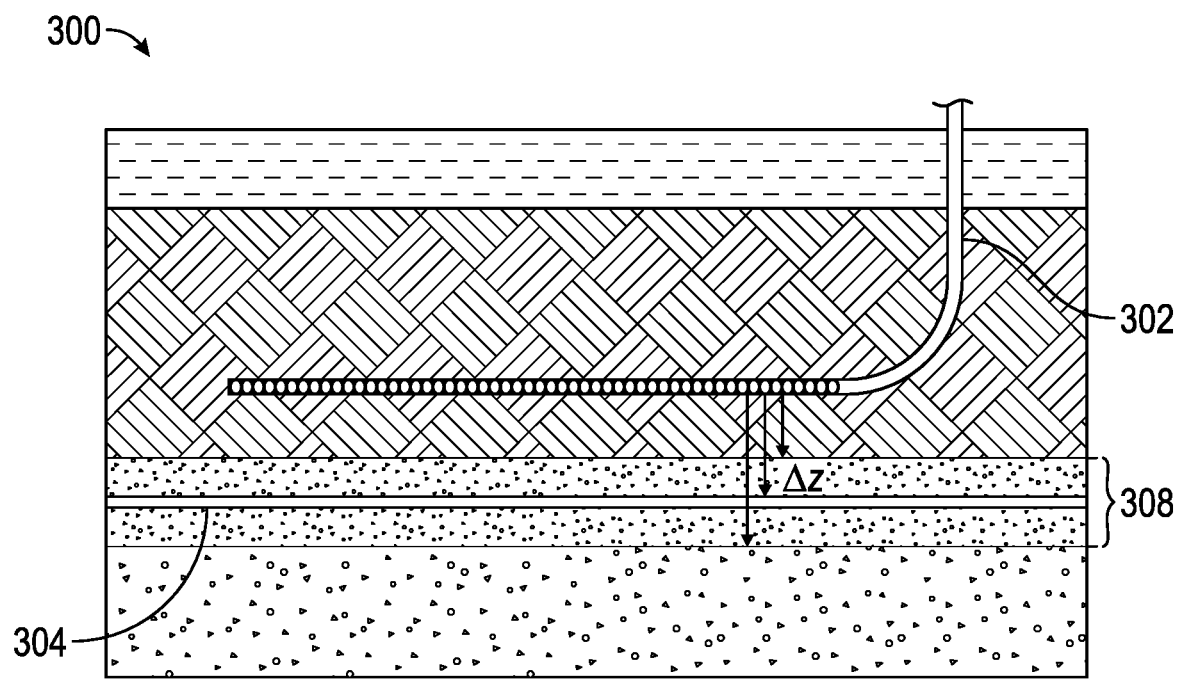
Figure 3D:
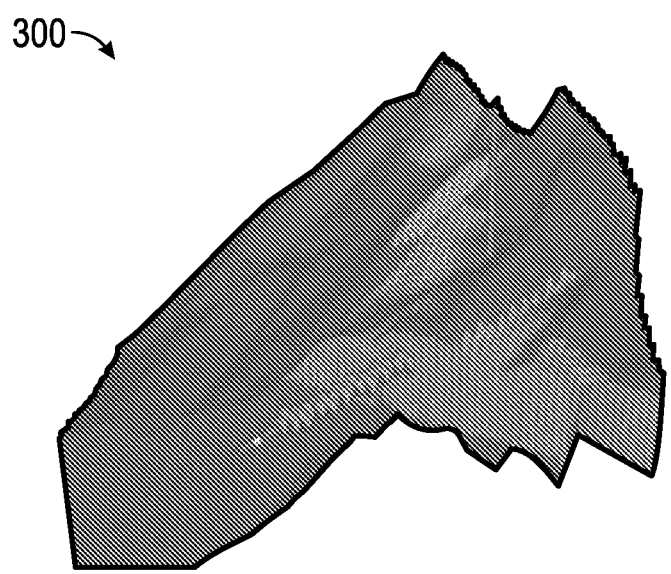

As mentioned above, the method 200 may be employed using DDR data and/or inverted models. The DDR data may be used, for example, to determine, or at least reduce the uncertainty of a location of an oil-water contact location. FIG. 3A illustrates an example of a model 300 including a well 302. As shown, the well 302 may include a horizontal section, but this is merely an example. The model 300 may also identify the oil-water contact (OWC) line 304, which may be offset by a distance Δz from the horizontal section of the well 302. The OWC line 304 may be straight in some sections, and may be "ratty" in others, or may be entirely straight or entirely ratty, without limitation. In the model 300, the OWC line 304 is considered to be deterministically known, i.e., a single number is used for Δz. FIG. 3B shows the model 300 and the well 302, but with flow control devices 306 positioned along the horizontal section of the well 300. FIG. 3C illustrates the model 300, but with the distance Δz to the OWC line 304 having a range of uncertainty associated therewith. The case of the model 300 incorporating uncertainty is discussed below. FIG. 3D illustrates a visualization of the reservoir model in three-dimensions.

Figure 4:
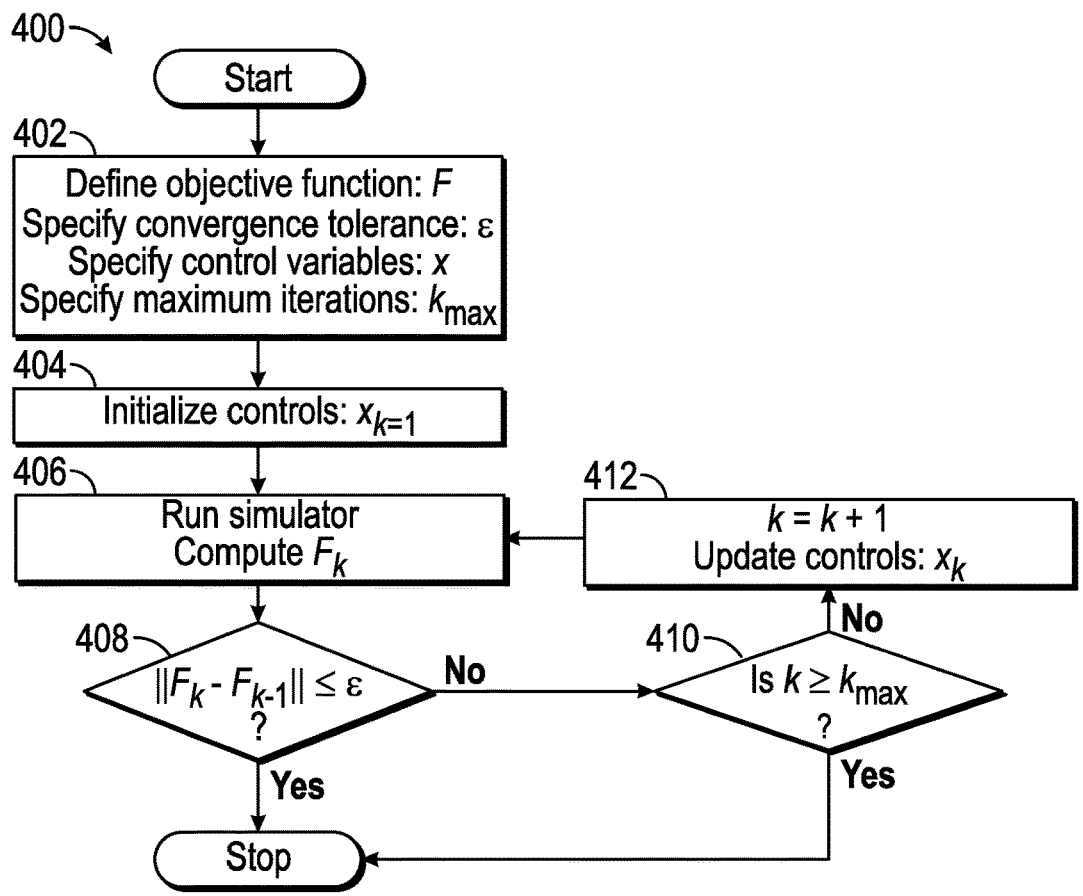
FIG. 4 illustrates a flowchart of a method for selecting a control parameter, according to an embodiment.

FIG. 4 illustrates a flowchart of a method 400 for selecting a parameter, according to an embodiment. The method 400 may be employed in the parameter sections at boxes 208 and 210 of the method 200 shown in and discussed above with reference to FIG. 2.

At block 402, the method 400 may include defining an objective function. The objective function may, in some embodiments, be based on the net present value of a well. For example, the objective function may be based on a net value over some period of time, for example, 2550 days, and discounted accordingly for the time value of money, although this is but one specific example and other timelines may be employed. In other embodiments, the objective function may be configured to maximize production and/or recovery of hydrocarbons. The method 400 may also include specifying a convergence tolerance, control variables (e.g., control parameters), and may set a maximum number of iterations. Further, the method 400, in calculating the value for the objective function, may include applying values for oil price, treatment cost, liquid lifting cost, transportation cost, among others. The method 400 may also apply a discount rate.

The method 400 may then initialize the control variables (control parameters), as at 404, e.g., by setting the control variables to some initial value, e.g., a default value, best guess, etc. At block 406, the method 400 may then run a similar simulation, based on the model and using the control variables specified, to compute a value of the objective function for the iteration. At block 408, the method 400 may then determine if the value of the objective function is greater than the value from the previous iteration by at least the convergence tolerance. If it is not, the method 400 may proceed to determining whether the number of iterations has reached the maximum, as at 410. If not, the method 400 may increment the number of iterations and update the control variables, as at 412. The method 400 may then return to running the simulator at 406. On the other hand, if either of the two loop-breaking conditions (convergence tolerance reaches or maximum number of iterations reaches), the method 400 may end.

Figure 5:
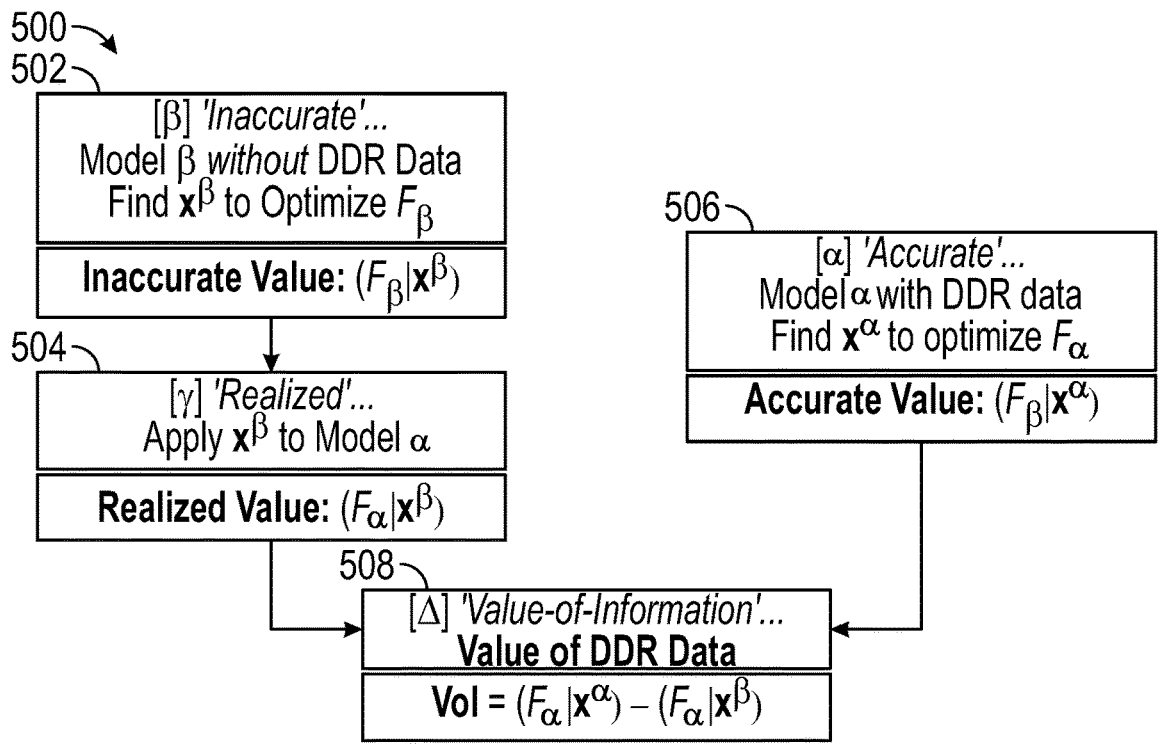
FIG. 5 illustrates a flowchart of a method for valuating a new measurement, according to an embodiment.

FIG. 5 illustrates a flowchart of a method 500 for valuating a new measurement, according to an embodiment. The method 500 is illustrated in terms of DDR data, but it will be appreciated that it may apply to other types of data as well.

The method 500 may include employing two different models: an α model and a β model. The α model may be the enhanced model referred to above with reference to FIG. 2, and the β model may be the baseline model. Accordingly, the β model may be considered inaccurate relative to the accurate α model.

At 502, the method 500 may include finding the control parameters $x^\beta$ based on the objective function $F_\beta$, as explained above with reference to FIG. 4. The value based on the objective function with the "inaccurate" control parameters may be referred to as the inaccurate value of the objective function, $(F_\beta|x^\beta)$.

At 504, the method 500 may determine the realized value, by applying the control parameters $x^\beta$ to the enhanced α model. The realized value may thus be expressed as $(F_\alpha|x^\beta)$.

At 506, the method 500 may include determining the accurate value for $(F_\alpha|x^\alpha)$ by selecting the control parameters $x^\alpha$ based on the enhanced α model.

At 508, the method 500 may include comparing the realized value and the accurate value. The difference between these two values may be the value of the new measurements and/or related processing, e.g., the DDR data and/or inversion-derived models.

Referring again to FIG. 3C, in some situations, there may be an uncertainty associated with the location of the oil-water contact line 304, such that it is reasonably certain that it falls within a zone or range of uncertainty 308. The OWC line 304 may, however, not be deterministically known. Indeed, this may be more realistic that a model that considers the OWC line 304 (or any other measurement) to be deterministically known.

Figure 6:
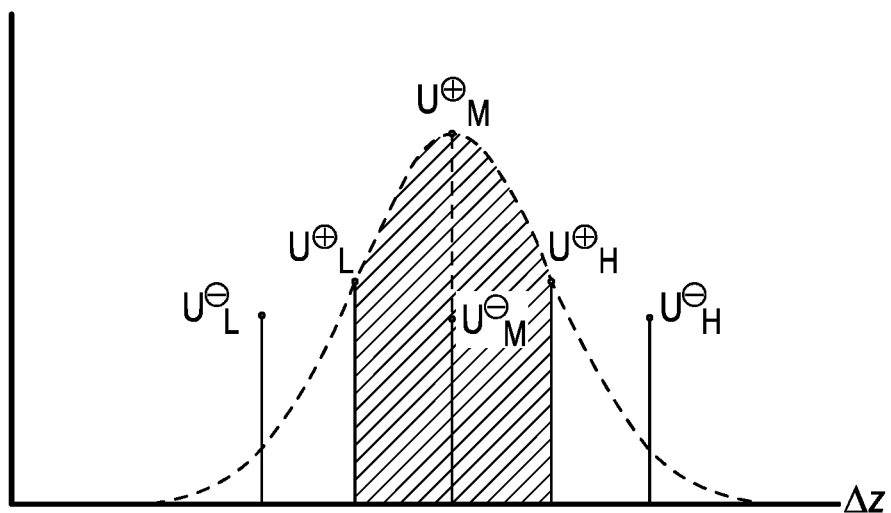
FIG. 6 illustrates a probability density function for the position of the oil-water contact, according to an embodiment.

FIG. 6 illustrates a probability density function for the position of the oil-water contact 304, according to an embodiment. Two situations are represented, one in which there is no information (e.g., no DDR data) for the location, beyond an identification of the zone of uncertainty 308. As such, three uncertainty samples are illustrated, equally distributed across the zone 308, low, medium, and high, noted as $U_L$, $U_M$, and $U_H$, respectively, may be equi-probable.

Conversely, in a situation where data related to the location of the OWC 204 within the zone of uncertainty 308, the distribution may, for example, be Gaussian. As such, three location estimates—again, low, medium, and high $U_L^\oplus$, $U_M^\oplus$, and $U_H^\oplus$. The middle estimate $U_M^\oplus$ may be at the mean of the Gaussian distribution, while the low $U_L^\oplus$ and high $U_H^\oplus$ are offset from the mean by one standard deviation, by way of an illustrative example. Moreover, depending on the Gaussian distribution, the low and high may be closer to the mean than the three equally distributed guesses $U_L$, $U_M$, and $U_H$.

More generally, the model may include a set of uncertainties $U \in \{(U_1, \ldots, U_n\}$, representing n uncertainty samples. Uncertainty samples that do not benefit from the new measurement data are denoted as $U \in \{U_1, \ldots, U_n\}$, and uncertainty samples that do benefit from the new measurement data are denoted as $U^\oplus \in \{U_1^\oplus, \ldots, U_n^\oplus\}$.

Figure 7:
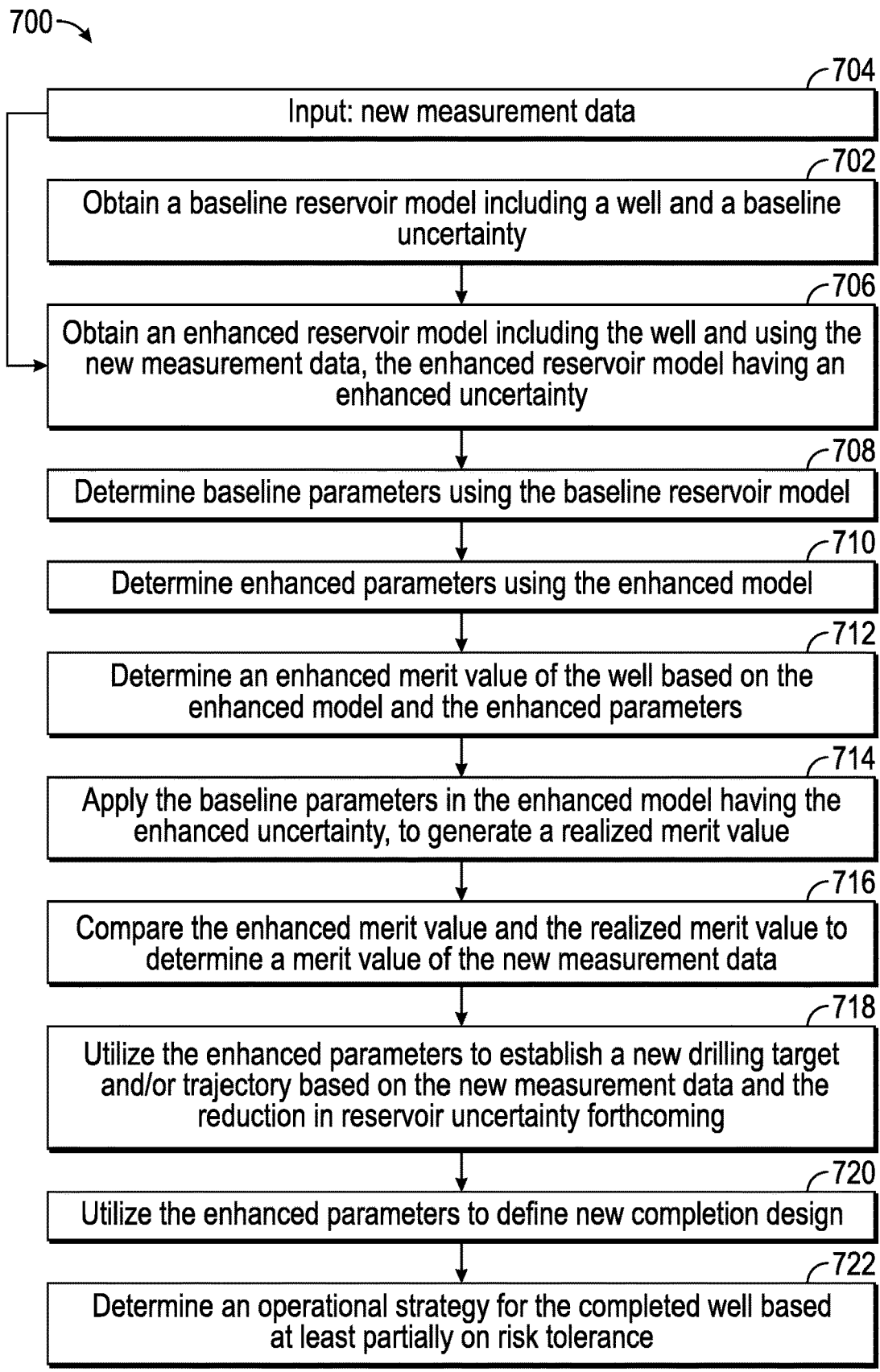
FIG. 7 illustrates a flowchart of a method for valuating information, according to an embodiment.

FIG. 7 illustrates a flowchart of a method 700 for valuating information, according to an embodiment. As with the method 200 discussed above, the method 700 is described herein with reference to DDR data and determining the oil-water contact location in a reservoir; however, the method 700 may also apply in other contexts.

The method 700 may include obtaining a baseline reservoir model including a well and a baseline uncertainty, as at 702. The baseline model may digitally represent a subterranean volume of interest, e.g., with the well of the model penetrating this volume. The baseline reservoir model may be obtained by receiving the reservoir model from another application, based on measurements taken in the field using various sensors and tools. In some embodiments, the method 700 may include building the model based on such measurements.

The method 700 may further include receiving, as input, new measurement data, as at 704. The new measurement data 700 may be, for example, DDR data and/or inverted models tending to show the location of oil-water contact in a reservoir, or other subterranean characteristics. In some embodiments, other types of data may instead or additionally be included in the new measurement data. The baseline model may not include the new measurement data.

The method 700 may employ the new measurement data to alter the baseline reservoir model, thereby resulting in an enhanced reservoir model, which may again include the well, as at 706. The new measurement may provide information about one or more aspects of the subterranean domain, such as, for example, the location of the oil-water contact in the reservoir. This may reduce the uncertainty associated with this characteristic. For example, the probability density function of the location of the OWC may resemble the Gaussian distribution shown in FIG. 6.

Before, during, or after obtaining the enhanced model, the method 700 may determine one or more baseline control parameters using the baseline reservoir model, with the baseline uncertainty, as at 708. The method 700 may also include determining one or more enhanced control parameters using the enhanced model, with the enhanced uncertainty, as at 710. The determination of these control parameters, e.g., setting the flowpath areas of the flow control devices of the completion, may be determined using any suitable optimization techniques. Various different techniques may be specifically tailored for use with different types of control parameters.

The method 700 may also include determining an enhanced merit value of the well based on the enhanced model and the enhanced control parameters, as at 714. The method 700 may also include applying the baseline control parameters in the enhanced model to generate a realized merit value, as at 714. The method 700 may then include comparing the enhanced merit value and the realized merit value to determine a merit value of the new measurement data, as at 718, similar to the comparison made above in method 200.

The method 700 may then utilize the enhanced control parameters to establish a new drilling target (e.g., a different drilling target than otherwise would have been employed based on the baseline model), and/or a new trajectory based on the new measurement data and the reduction in reservoir uncertainty, as at 720. Additionally or instead, the method 700 may include utilizing the enhanced control parameters to define a new completion design, as at 722, and/or determining an operational strategy for the completed well based at least partially on risk tolerance, as at 724.

Figure 8:
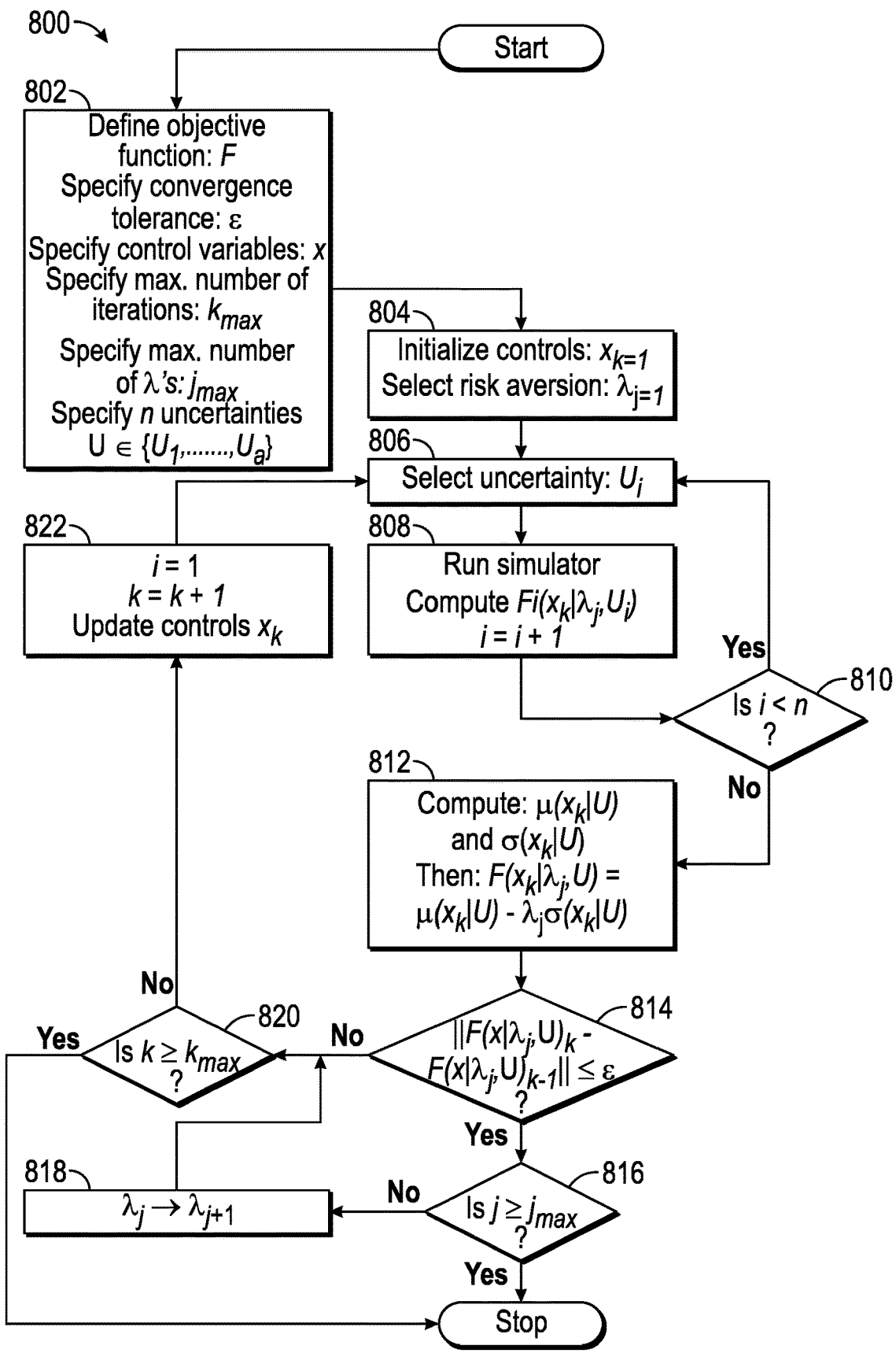
FIG. 8 illustrates a flowchart of a method for selecting a control parameter, while considering uncertainty, according to an embodiment.

FIG. 8 illustrates a flowchart of a method 800 for selecting a control parameter (or set of control parameters) while considering uncertainty, according to an embodiment. The method 800 may be similar to the method 400, shown in FIG. 4, with the additional consideration of uncertainty.

The method 800 may begin by defining an objective function F, convergence tolerance ε, control variables (e.g., "control parameters") x, a maximum number of iterations, a maximum number of risk aversion values λ, and n uncertainties, $U \in \{U_1, \ldots, U_n\}$, as at 802.

The objective function may be revised from the deterministic objective function discussed above. For example, the revised objective function may have the form:

$$F(x|\lambda, U) = \mu(x|U) - \lambda\sigma(x|U) \qquad (1)$$

where x is the set of control parameters, λ is a risk-aversion parameter, and σ is the standard deviation of the probability density function of the uncertainty. A greater risk aversion may yield a higher λ value. Further, the risk-aversion parameter λ may be predetermined or received as input in the method 800.

Equation 1 may be considered a utility function, and thus the value of the objective function F may be a "figure-of-merit" rather than an explicit NPV, but may have units in terms of currency. For purposes of the present disclosure, the "figure-of-merit" may be considered as representing the value of the well.

The risk-aversion factor λ may be user-defined to suit the specific risk tolerances of the decision maker. For example, if one is risk neutral (i.e., risk plays no part in the decision), then the risk-aversion factor λ may be set to zero, and set to positive values otherwise, depending on the level of risk aversion.

The method 800 may also include initializing the control variables $x_{k=1}$ and the risk aversion $\lambda_{j=1}$, as at 804. The method 800 may then include selecting an uncertainty $U_i$.

The method 800 may then include running the simulator and computing the objective function $F_i(x_k|\lambda_j, U_i)$, and incrementing the operator i, as at 808. If i is less than the number of uncertainties n, as determined at 810, the method 800 may return to selecting the next uncertainty, as at 806. Otherwise, the method 800 may proceed to computing $\mu(x_k|U)$ and $\sigma(x_k|U)$, and $F(x_k|\lambda_j, U) = \mu(x_k|U) - \lambda_j\sigma(x_k|U)$, as at 810. The method 800 may then proceed to determining whether the difference between the objective function calculated in the present iteration $(F(x|\lambda_j, U)_k)$ differs from the objective function calculated in the previous iteration $(F(x|\lambda_j, U)_{k-1})$. If it does, the method 800 may include checking to see if the loop control variable j (the number of risk aversion values) is greater than or equal to its maximum, as at 816. If it is, the method 800 may stop. Otherwise, the method 800 may set the risk aversion value $\lambda_j$ to the next value, as at 818. The method 800 may then determine whether there is another k value (based on the number of control variables x), as at 820. As shown, this may also be the result if the determination at 814 is negative. If another k value is not available, the method 800 may end. Otherwise, the method 800 may reset i to 1, increment k, and update the control variables $x_k$, as at 822.

Figure 9:
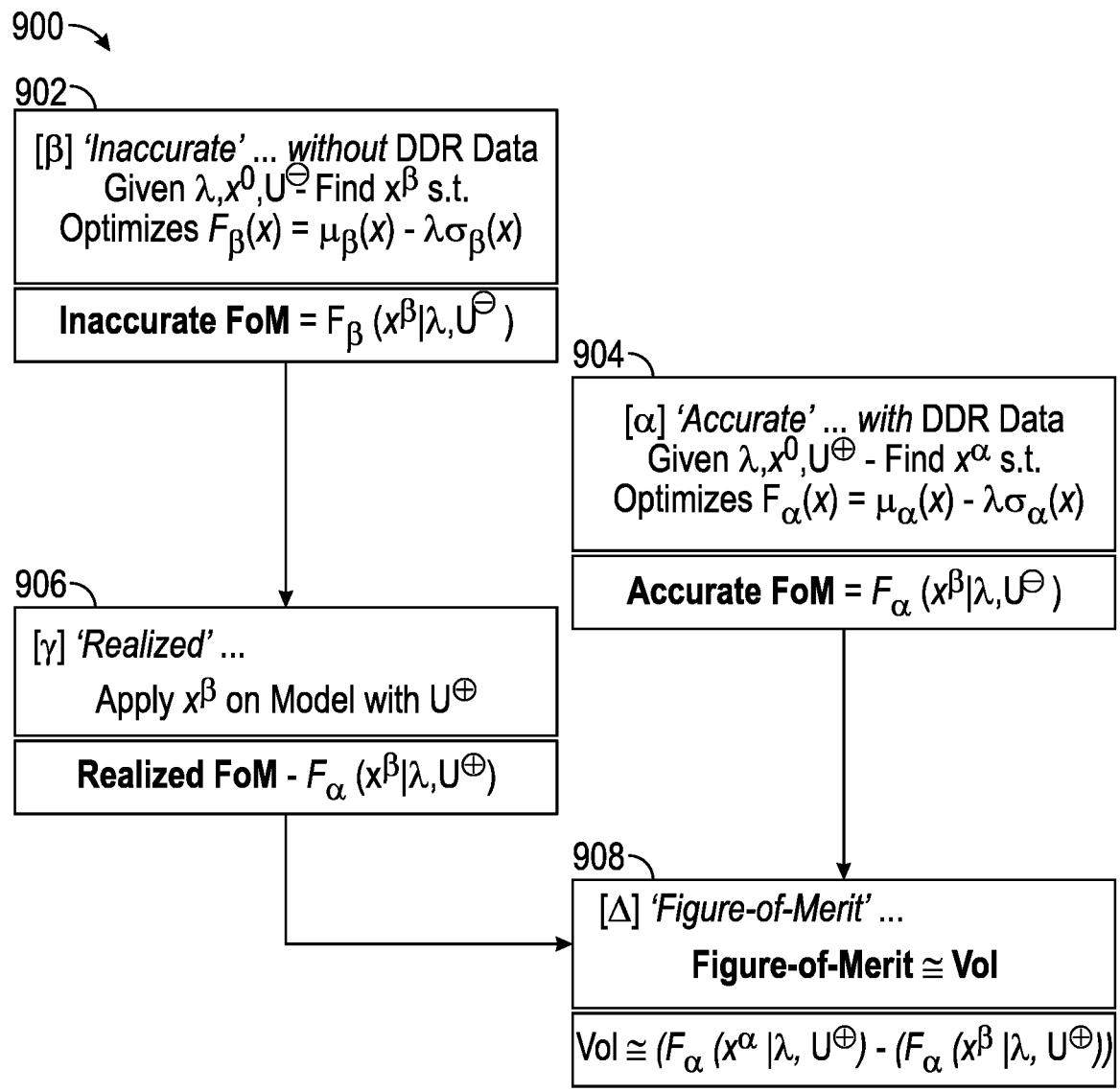
FIG. 9 illustrates a flowchart of a method for valuating information, with the consideration of uncertainty, according to an embodiment.

FIG. 9 illustrates a flowchart of a method 900 for valuating information, which may be similar to the method 500 shown in FIG. 5 above, but with the additional consideration of uncertainty, according to an embodiment. The method 900 may include finding the baseline control parameters $x^\beta$ based on the baseline model (i.e., the "inaccurate" model), given the risk aversion λ, $x_0$, and uncertainty U, as at 902. In an embodiment, the baseline control parameters $x^\beta$ may be selected to optimize the objective function $F_\beta(x) = \mu_\beta(x) - \lambda\sigma_\beta(x)$. From this, a "Figure of Merit" representing a value of the well, may be determined as $F_\beta(x^\beta|\lambda, U^\oplus)$.

Next, the method 900 may similarly determine the enhanced control parameters $x^\alpha$ based on the "accurate" or enhanced model that accounts for the new measurement (e.g., DDR) data, as at 904. As shown, this may yield a FOM based on the enhanced model of $F_\beta(x^\beta|\lambda, U^\oplus)$.

The method 900 may then include determining a "realized" FOM using the baseline control parameters $x^\beta$ in the enhanced model with the enhanced uncertainty $U^\oplus$, as at 906. This may be expressed as the realized FOM equaling $F_\alpha(x^\beta|\lambda, U^\oplus)$. Finally, a comparison of the enhanced FOM and the realized FOM yields a term that represents the value of the new measurement data, calculated at 908.

Example

As noted above, flowpath area for flow control devices in a wellbore, in view of new measurement data collected from DDR-measuring tools related to the location of the OWC may be an instructive example, which may further an understanding of the present disclosure. Thus, let x denote the set of control variables ("CVs") used to maximize the objective function F. Two general types of CVs may be considered: ICD nozzle flow area ($A_c$) and production guide rates for different periods, e.g., the total liquid rate LRAT. Guide rate control may also be provided. Input control parameters for the simulation are provided in Table 1. Results from an example of four different simulations are provided below in Table 2.

| Control parameter (of the objective function) | Value | Units |
|---|---|---|
| Oil Price | 410.00 | $/Sm³ [oil] |
| Treatment Cost (applies to produced water) | 27.75 | $/Sm³ [water] |
| Liquid Lifting Cost (applies to produced liquid (water + oil)) | 47.50 | $/Sm³ [oil] |
| Transportation Cost (applies to oil) | 4.25 | $/Sm³ [liquid] |

TABLE 2

(Note that "S" stands for "Standard")

| Test | CV: $A_c$ | CV: LRAT (liquid rate) | Results (US$ × 10⁶) Unoptimized | Optimized |
|---|---|---|---|---|
| 1 | 4 | No | 27.12 | 100.2 |
| 2 | 4 | Yes | 27.12 | 100.9 |
| 3 | 39 | No | 27.80 | 98.2 |
| 4 | 39 | Yes | 27.80 | 112.2 |

In this example, nozzle size (cross-sectional flowpath area) $A_c$ is the control parameter adjusted. The pressure drop across the device constriction $\delta P_c$ is:

$$\delta P_c = C_U \frac{\rho_m v_c^2}{2 C_v^2} \quad (2)$$

where $v_c$ is the flow velocity through the constriction, which is defined as:

$$v_c = \frac{q_m}{A_c} \quad (3)$$

where the in situ mixture flow rate $q_m$ is determined using a simulator. Thus, the cross-sectional area $A_c$ for each flow control device is the control variable (baseline or enhanced control parameter) for optimization. $C_U$ may be a units conversion factor, and $C_v$ may be a dimensionless flow coefficient for the flow control device, which may be known a priori.

From the results shown in Table 2, it is seen that the value of the well increases greatly with the optimization of the cross-sectional areas, and may increase to varying extents with the provision of liquid rate control (denoted as LRAT).

Figure 10:
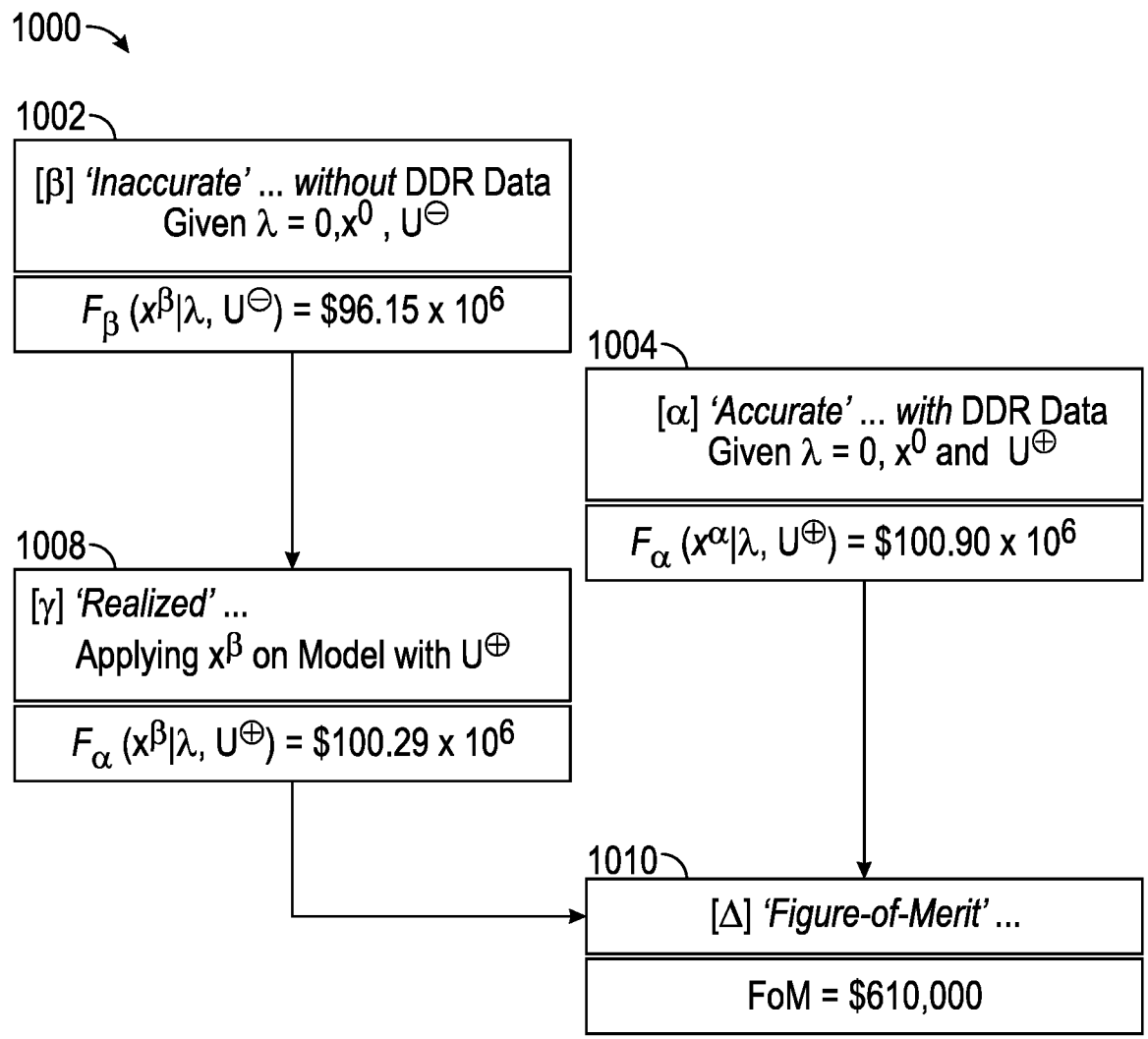
FIG. 10 illustrates a flowchart of a method for valuating new measurement data, applied to a specific comparison of two models, according to an embodiment.

FIG. 10 illustrates a flowchart of a method 1000 for valuating new measurement data, applied to a specific comparison of two models, one enhanced (i.e., "accurate" or $\alpha$ model), and one baseline (i.e., "inaccurate" or $\beta$ model), according to an embodiment. The method 1000 may thus be a specific implementation of an embodiment of the method 900. The method 100 may include determining that the FOM (Figure-of-Merit) for the well in the baseline model, with the baseline parameters, is about $96.15 million, as at 1002. The method 1000 may also include determining that the FOM for the well in the enhanced model, with the optimized enhanced control parameters, is about $100.90 million, as at 1004. The method 1000 may further include applying the optimized baseline control parameters into the enhanced model, to determine the "realized" FOM is about $100.29 million, as at 1006. The method 1000 may then include comparing the accurate FOM and the realized FOM (e.g., by subtracting the realized from the accurate), to yield a FOM for the new measurements themselves, as at 1008, which, in this case, yields a FOM of $610,000. This information may be used, for example, to justify additional measurements of the same type, whether in different wells or in the same well, e.g., by comparing the costs associated therewith with the benefit (FOM) of the new measurements.

FIG. 11 illustrates an example of the resulting change in the flow control devices of a completion, according to an embodiment. As shown, there are two schematics, one 1102 of the completion using the enhanced model $\alpha$, and one 1104 of the completion using the baseline model $\beta$. The circles depicted depict the flowpath area of the flow control devices, with larger circles indicating greater flowpath areas (e.g., larger diameter of the orifice). Further, each of the schematics 1102, 1104 is broken into four sections, which are the sections in which the flowpath area is independently controlled in this example. Each section may represent one or several flow control devices. In other examples, any number of sections may be independently controlled. As shown, the flowpath areas in the left-most section and the second-to-the-right section are most clearly changed by the switching to the enhanced model.

Figure 12:
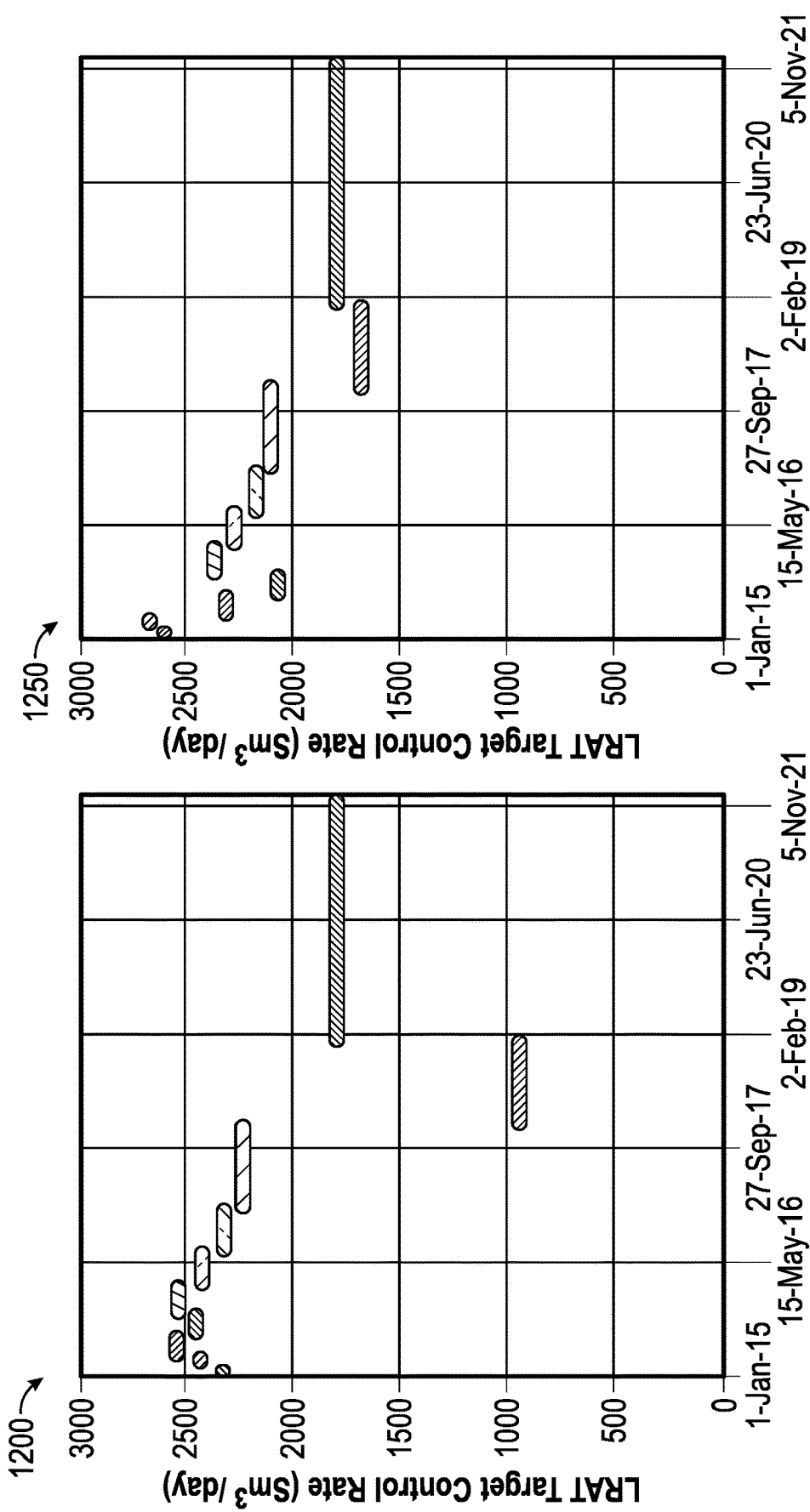
FIGS. 12A and 12B illustrate two plots of liquid flowrate (LRAT), according to an embodiment.

FIGS. 12A and 12B illustrate two plots 1200, 1250 of LRAT flowrate, in an LRAT controlled system as discussed above, according to the enhanced model and the baseline model, respectively. Each line segment represents a period of time. As can be seen, the control rates differ, generally calling for a larger target control rate in the early (toward the left of the plots) periods.

In some embodiments, the methods discussed above may be employed to further reduce uncertainty by eliminating competing models. For example, a certain number of competing models for the reservoir may initially be plausible. At various points during the drilling of the well, new measurements (e.g., DDR measurements and/or interpretation thereof) may be received, and based upon these measurements, one or more of the competing models may be eliminated. As the drilling and measuring continues, more and more of the competing models may be eliminated.

Figure 13:
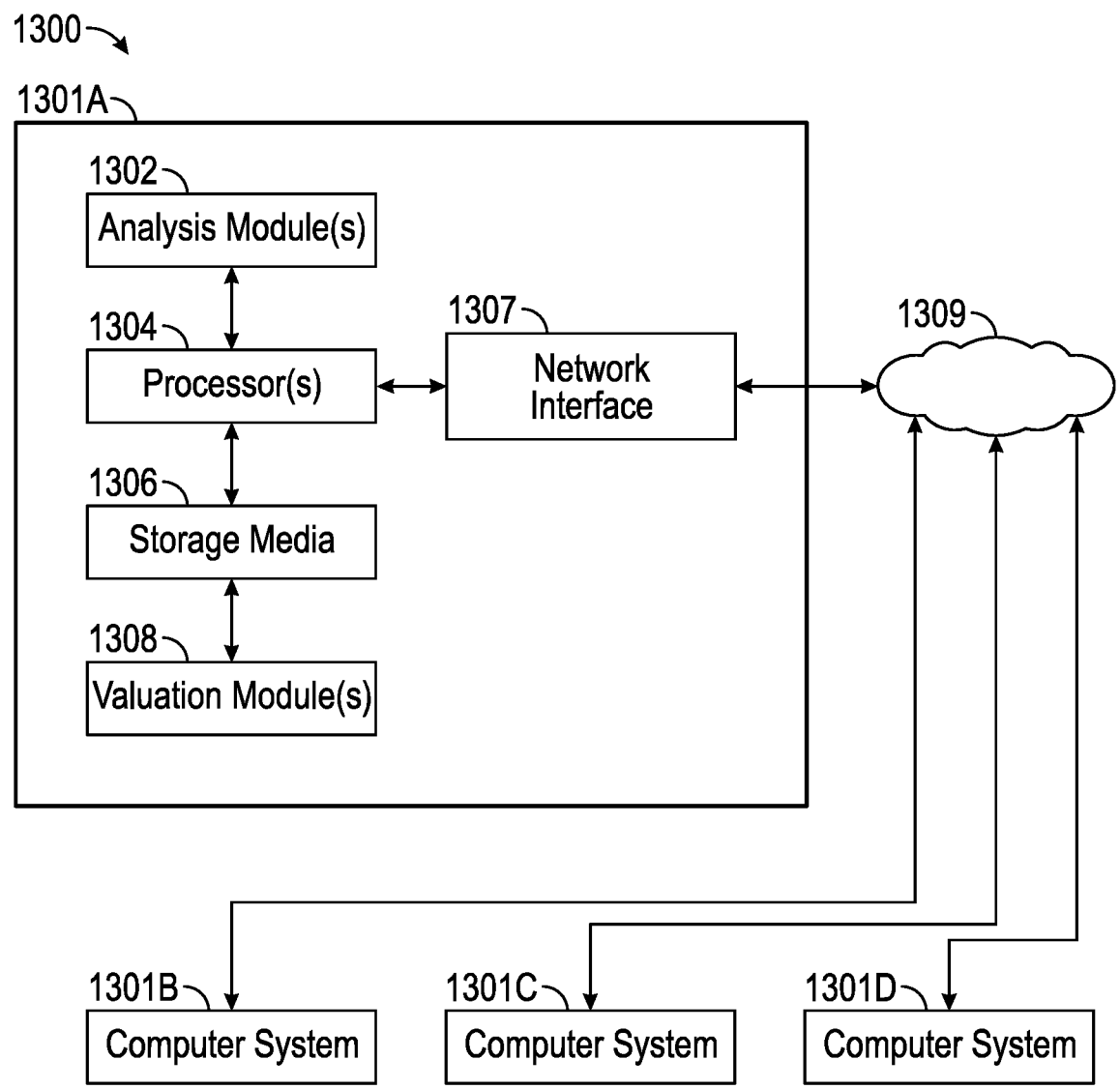
FIG. 13 illustrates a schematic view of a computing system, according to an embodiment.

In some embodiments, the methods of the present disclosure may be executed by a computing system. FIG. 13 illustrates an example of such a computing system 1300, in accordance with some embodiments. The computing system 1300 may include a computer or computer system 1301A, which may be an individual computer system 1301A or an arrangement of distributed computer systems. The computer system 1301A includes one or more analysis modules 1302 that are configured to perform various tasks according to some embodiments, such as one or more methods disclosed herein. To perform these various tasks, the analysis module 602 executes independently, or in coordination with, one or more processors 1304, which is (or are) connected to one or more storage media 1306. The processor(s) 1304 is (or are) also connected to a network interface 1307 to allow the computer system 1301A to communicate over a data network 1309 with one or more additional computer systems and/or computing systems, such as 1301B, 1301C, and/or 1301D (note that computer systems 1301B, 1301C and/or 1301D may or may not share the same architecture as computer system 1301A, and may be located in different physical locations, e.g., computer systems 1301A and 1301B may be located in a processing facility, while in communication with one or more computer systems such as 1301C and/or 1301D that are located in one or more data centers, and/or located in varying countries on different continents).

A processor may include a microprocessor, microcontroller, processor module or subsystem, programmable integrated circuit, programmable gate array, or another control or computing device.

The storage media 1306 may be implemented as one or more computer-readable or machine-readable storage media. Note that while in the example embodiment of FIG. 13 storage media 1306 is depicted as within computer system 1301A, in some embodiments, storage media 1306 may be distributed within and/or across multiple internal and/or external enclosures of computing system 1301A and/or additional computing systems. Storage media 1306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 1300 contains one or more valuation module(s) 1308. In the example of computing system 1300, computer system 1301A includes the valuation module 1308. In some embodiments, a single valuation module may be used to perform some aspects of one or more embodiments of the methods disclosed herein. In other embodiments, a plurality of valuation modules may be used to perform some aspects of methods herein.

It should be appreciated that computing system 1300 is merely one example of a computing system, and that computing system 1300 may have more or fewer components than shown, may combine additional components not depicted in the example embodiment of FIG. 13, and/or computing system 1300 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Geologic interpretations, models, and/or other interpretation aids may be refined in an iterative fashion; this concept is applicable to the methods discussed herein. This may include use of feedback loops executed on an algorithmic basis, such as at a computing device (e.g., computing system 1300, FIG. 13), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated. The claims following do not invoke § 112(f) unless they include the phrase "means for."

What is claimed is:

1. A method for optimizing completion of a well that traverses a subsurface volume based on valuation of particular directional resistivity measurement data pertaining to the subsurface volume, the method comprising:

obtaining a first reservoir model of the subsurface volume including the well, wherein the first reservoir model includes locations and delineation of rock formations, characteristics of the rock formations, hydrocarbon and water locations and distributions, an oil-water contact location, and a first set of uncertainties associated with the oil-water contact location, wherein the first reservoir model is not based on the particular directional resistivity measurement data and the first set of uncertainties do not benefit from the particular directional resistivity measurement data;

determining a baseline control parameter based on the first reservoir model, wherein the baseline control parameter represents a flowpath area for at least one flow control device in a completion that extends across a section of the well, and wherein determining the baseline control parameter involves evaluation of an objective function based on the first set of uncertainties of the first reservoir model;

measuring the particular directional resistivity measurement data pertaining to the subsurface volume using a data collection device;

generating a second reservoir model of the subsurface volume including the well, wherein the second reservoir model includes locations and delineation of rock formations, characteristics of the rock formations, hydrocarbon and water locations and distributions, an oil-water contact location, and a second set of uncertainties associated with the oil-water contact location, and wherein the second reservoir model is based on the particular directional resistivity measurement data and the second set of uncertainties do benefit from the particular directional resistivity measurement data;

determining an enhanced control parameter based on the second reservoir model, wherein the enhanced control parameter represents a flowpath area for the at least one flow control device in a completion that extends across a section of the well, and wherein determining the enhanced control parameter involves evaluation of the objective function based on the second set of uncertainties of the second reservoir model;

determining an enhanced value of the well using the second reservoir model and the enhanced control parameter, wherein the enhanced value of the well is based on estimated amount of hydrocarbons recovered from the well when operating the well according to the enhanced control parameter;

determining a realized value of the well using the second reservoir model and the baseline control parameter, wherein the realized value of the well is based on estimated amount of hydrocarbons recovered from the well when operating the well according to the baseline control parameter;

calculating a value of the particular directional resistivity measurement data by comparing the enhanced value of the well and the realized value of the well;

using the value of the particular directional resistivity measurement data to justify measuring additional directional resistivity measurement data pertaining to the subsurface volume; and setting or controlling the flowpath area for the at least one flow control device in the completion that extends along the section of the well based on the enhanced control parameter derived from the second reservoir model and the particular directional resistivity measurement data.

2. The method of claim 1, wherein the first set of uncertainties comprises a uniform probability distribution across a zone of uncertainty associated with the oil-water contact location of the first reservoir model, and wherein the second set of uncertainties comprises a Gaussian probability distribution across the zone of uncertainty associated with the oil-water contact location of the second reservoir model.

3. The method of claim 1, wherein the objective function includes a risk aversion factor.

4. The method of claim 1, wherein determining the baseline control parameter comprises selecting the baseline control parameter that maximizes a value corresponding to the first reservoir model.

5. A computing system, comprising:
one or more processors; and
a memory system including one or more non-transitory computer-readable media storing instructions that, when executed by at least one of the one or more processors, cause the computing system to perform operations, the operations comprising:

obtaining a first reservoir model of a subsurface volume including a well, wherein the first reservoir model includes locations and delineation of rock formations, characteristics of the rock formations, and hydrocarbon and water locations and distributions, an oil-water contact location, and a first set of uncertainties associated with the oil-water contact location, wherein the first reservoir model is not based on particular directional resistivity measurement data pertaining to the subsurface volume and the first set of uncertainties do not benefit from the particular directional resistivity measurement data;

determining a baseline control parameter based on the first reservoir model, wherein the baseline control parameter represents a flowpath area for at least one flow control device in a completion that extends across a section of the well, and wherein determining the baseline control parameter involves evaluation of an objective function based on the first set of uncertainties of the first reservoir model;

measuring the particular directional resistivity measurement data pertaining to the subsurface volume using a data collection device;

generating a second reservoir model of the subsurface volume including the well, wherein the second reservoir model includes locations and delineation of rock formations, characteristics of the rock formations, hydrocarbon and water locations and distributions, an oil-water contact location, and a second set of uncertainties associated with the oil-water contact location, and wherein the second reservoir model is based on the particular directional resistivity measurement data and the second set of uncertainties do benefit from the particular directional resistivity measurement data;

determining an enhanced control parameter based on the second reservoir model, wherein the enhanced control parameter represents a flowpath area for the at least one flow control device in a completion that extends across a section of the well, and wherein determining the enhanced control parameter involves evaluation of the objective function based on the second set of uncertainties of the second reservoir model;

determining an enhanced value of the well using the second reservoir model and the enhanced control parameter, wherein the enhanced value of the well is based on estimated amount of hydrocarbons recovered from the well when operating the well according to the enhanced control parameter;

determining a realized value of the well using the second reservoir model and the baseline control parameter, wherein the realized value of the well is based on estimated amount of hydrocarbons recovered from the well when operating the well according to the baseline control parameter;

calculating a value of the particular directional resistivity measurement data by comparing the enhanced value of the well and the realized value of the well;

using the value of the particular directional resistivity measurement data to justify measuring additional directional resistivity measurement data pertaining to the subsurface volume; and setting or controlling the flowpath area for the at least one flow control device in the completion that extends along the section of the well based on the enhanced control parameter derived from the second reservoir model and the particular directional resistivity measurement data.

6. The system of claim 5, wherein the first set of uncertainties comprises a uniform probability distribution across a zone of uncertainty associated with the oil-water contact location of the first reservoir model, and wherein the second set of uncertainties comprises a Gaussian probability distribution across the zone of uncertainty associated with the oil-water contact location of the second reservoir model.

7. The system of claim 5, wherein the objective function includes a risk aversion factor.

8. The system of claim 5, wherein determining the baseline control parameter comprises selecting the baseline control parameter that maximizes a value corresponding to the first reservoir model.

9. A non-transitory computer-readable medium storing instructions that, when executed by at least one processor of a computing system, cause the computing system to perform operations, the operations comprising:

obtaining a first reservoir model of a subsurface volume including a well, wherein the first reservoir model includes locations and delineation of rock formations, characteristics of the rock formations, and hydrocarbon and water locations and distributions, an oil-water contact location, and a first set of uncertainties associated with the oil-water contact location, wherein the first reservoir model is not based on particular directional resistivity measurement data pertaining to the subsurface volume and the first set of uncertainties do not benefit from the particular directional resistivity measurement data;

determining a baseline control parameter based on the first reservoir model, wherein the baseline control parameter represents a flowpath area for at least one flow control device in a completion that extends across a section of the well, and wherein determining the baseline control parameter involves evaluation of an objective function based on the first set of uncertainties of the first reservoir model;

measuring the particular directional resistivity measurement data pertaining to the subsurface volume using a data collection device;

generating a second reservoir model of the subsurface volume including the well, wherein the second reservoir model includes locations and delineation of rock formations, characteristics of the rock formations, hydrocarbon and water locations and distributions, an oil-water contact location, and a second set of uncertainties associated with the oil-water contact location, and wherein the second reservoir model is based on the particular directional resistivity measurement data and the second set of uncertainties do benefit from the particular directional resistivity measurement data;

determining an enhanced control parameter based on the second reservoir model, wherein the enhanced control parameter represents a flowpath area for the at least one flow control device in a completion that extends across a section of the well, and wherein determining the enhanced control parameter involves evaluation of the objective function based on the second set of uncertainties of the second reservoir model;

determining an enhanced value of the well using the second reservoir model and the enhanced control parameter, wherein the enhanced value of the well is based on estimated amount of hydrocarbons recovered from the well when operating the well according to the enhanced control parameter;

determining a realized value of the well using the second reservoir model and the baseline control parameter, wherein the realized value of the well is based on estimated amount of hydrocarbons recovered from the well when operating the well according to the baseline control parameter;

calculating a value of the particular directional resistivity measurement data by comparing the enhanced value of the well and the realized value of the well;

using the value of the particular directional resistivity measurement data to justify measuring additional directional resistivity measurement data pertaining to the subsurface volume; and setting or controlling the flowpath area for the at least one flow control device in the completion that extends along the section of the well based on the enhanced control parameter derived from the second reservoir model and the particular directional resistivity measurement data.

10. The medium of claim 9, wherein the first set of uncertainties comprises a uniform probability distribution across a zone of uncertainty associated with the oil-water contact location of the first reservoir model, and wherein the second set of uncertainties comprises a Gaussian probability distribution across the zone of uncertainty associated with the oil-water contact location of the second reservoir model.

11. The medium of claim 9, wherein the objective function includes a risk aversion factor.

12. The medium of claim 9, wherein determining the baseline control parameter comprises selecting the baseline control parameter that maximizes a value corresponding to the first reservoir model.

* * * * *